United States Patent
Hart

(10) Patent No.: US 10,537,781 B2
(45) Date of Patent: Jan. 21, 2020

(54) PUTTING TRAINING SYSTEM AND METHOD OF USING THE SYSTEM

(71) Applicant: Monroe Hart, Homewood, IL (US)

(72) Inventor: Monroe Hart, Homewood, IL (US)

(\*) Notice: Subject to any disclaimer, the term of this patent is extended or adjusted under 35 U.S.C. 154(b) by 0 days.

(21) Appl. No.: 15/635,415

(22) Filed: Jun. 28, 2017

(65) Prior Publication Data

US 2019/0001210 A1    Jan. 3, 2019

(51) Int. Cl.
*A63B 69/36* (2006.01)
*G09B 19/00* (2006.01)

(52) U.S. Cl.
CPC ...... *A63B 69/3676* (2013.01); *G09B 19/0038* (2013.01); *A63B 2069/3679* (2013.01); *A63B 2225/09* (2013.01)

(58) Field of Classification Search
CPC .............. A63B 69/3676; G09B 19/0038
USPC ....... 473/172, 174, 176, 218, 257, 258, 260, 473/273, 405
See application file for complete search history.

(56) References Cited

U.S. PATENT DOCUMENTS

| | | | | |
|---|---|---|---|---|
| 2,929,628 A * | 3/1960 | Lane | .................... | A63B 57/357 473/176 |
| 5,211,400 A * | 5/1993 | Hall | .................... | A63B 69/3676 473/268 |
| 5,624,326 A * | 4/1997 | Hohl | .................. | A63B 69/3676 473/167 |
| 6,773,357 B2 * | 8/2004 | Tai | ...................... | A63B 69/3676 473/195 |
| 7,914,391 B2 * | 3/2011 | Crealese | ............ | A63B 69/3623 473/218 |
| 8,870,672 B2 * | 10/2014 | Downing | ............... | A63B 63/00 473/164 |
| 9,259,635 B2 * | 2/2016 | Downing | ............... | A63B 57/40 |
| 2013/0303298 A1 * | 11/2013 | Riedl | ................. | A63B 69/3676 473/257 |
| 2017/0036092 A1 * | 2/2017 | Aines | ................. | A63B 69/3676 |

\* cited by examiner

*Primary Examiner* — Melba Bumgarner
*Assistant Examiner* — Laura Davison
(74) *Attorney, Agent, or Firm* — Wood, Phillips, Katz, Clark & Mortimer

(57) ABSTRACT

A putting training system having: a) an alignment component; b) at least one frame configured to maintain the alignment component in a spaced relationship to a golf hole on a contoured putting surface with the at least one frame in an operative state upon the contoured putting surface; and c) at least one support configured to maintain the at least one frame in the operative state. The alignment component configured to be strategically spaced and located relative to a golf hole whereby a golf ball putted from a starting location spaced from the golf hole towards the alignment component will tend to track along the contoured putting surface towards the putting hole.

8 Claims, 3 Drawing Sheets

PUTTING TRAINING SYSTEM AND METHOD OF USING THE SYSTEM

BACKGROUND OF THE INVENTION

Field of the Invention

This invention relates to putting and, more particularly, to a system through which users can train for putting on non-flat surfaces. The invention is also directed to a method of using the system.

Background Art

Putting is a particularly challenging part of the game of golf. Many strokes are lost during golf rounds because players do not routinely practice effectively enough that they are confident when they putt, particularly on greens where they must navigate contours and slopes. They commonly putt simply by guessing at a ball path on non-flat surfaces with no genuine expectation of holing a putt or causing the ball to end up in close proximity to the hole.

One of the main reasons that many golfers lack this confidence is that they have not practiced in a manner to have purposeful repetition whereby they can translate what is learned on the practice green to the golf course.

Commonly, golfers will be seen practicing straight putts to develop a consistent stroke and learn to improve alignment and control distance. While this is an important training, few actual putts will be performed on a flat surface. When a golfer is faced with a putt over a contoured surface, he/she generally will not have the same confidence as with straight putts since envisioning of the ball path achieved through repetition is not engrained in memory. As a result, the putting involves a good deal of guessing, as a result of which a user may not only misread contour, but compromise the basic skills learned through practice related to the form of the stroke, distance control, etc.

The industry is always challenged to develop golfing aids that allow users to practice swings based upon replicated course conditions. To date, the inventor is unaware of any systems that allow golfers to practice to confidently repeat putting strokes on contoured surfaces.

SUMMARY OF THE INVENTION

In one form, the invention is directed to a putting training system including: a first alignment component configured to be situated at or adjacent a golf hole on a contoured putting surface; a second alignment component configured to be situated at a location spaced from the first alignment component; at least one frame configured to maintain the first and second alignment components in a strategically selected spaced relationship within a range of permitted spaced relationships; and at least one support for maintaining the at least one frame in an operative state wherein: a) the first alignment component is located at or adjacent to the golf hole; and b) the second alignment component is strategically spaced from the first alignment component in a manner that a golf ball putted from a starting location spaced from the golf hole towards the second alignment component will tend to track along the contoured putting surface towards the golf hole.

In one form, the at least one frame has a rail along which one of the first and second alignment components is guided in a path relative to the other of the first and second alignment components to thereby change a spacing between the first and second alignment components.

In one form, both of the first and second alignment components are mounted on the rail.

In one form, one of the first and second alignment components is in a fixed position on the rail.

In one form, the first alignment component has a first annular component on the at least one frame with an axis that is substantially concentric with a vertical axis of the golf hole with the at least one frame in the operative state. The first annular component is configured so that a golf ball moving from the starting position can move past a part of the first annular component and into the golf hole with the at least one frame in the operative state.

In one form, the second alignment component has a second annular component with a diameter substantially the same as a diameter of the golf hole.

In one form, the at least one support has first and second discrete components configured to be placed against the contoured putting surface to thereby stably support at least part of the at least one frame.

In one form, the at least one frame has a rail that spans between the first and second discrete components.

In one form, the rail is configured to support the first and second alignment components so that a spacing between the first and second alignment components can be selectively changed.

In one form, there are cooperating connectors on the rail and one of the first and second alignment components that cooperate to guide sliding movement of the one of the first and second alignment components along the rail and relative to the other of the first and second alignment components to thereby change a spacing between the first and second alignment components.

In one form, the second alignment component has a second annular component on the at least one frame. With the at least one frame in the operative state, the first and second alignment components are spaced above the contoured putting surface a distance that allows a conventional golf ball to move in a path up to, under, and past each of the first and second alignment components.

In one form, the at least one frame has a single unitary frame part.

In one form, the rail is elongate with a substantially straight length between lengthwise ends.

In one form, the at least one support has first and second discrete components provided one each at the lengthwise ends of the rail.

In one form, the path extends substantially horizontally.

In one form, the cooperating connectors are configured to frictionally maintain the rail and one of the first and second alignment components in a selected relationship with a predetermined holding force that can be overcome to change the relationship between the rail and the one of the first and second alignment components from the selected relationship.

In one form, the invention is directed to a putting training system including: an alignment component; at least one frame configured to maintain the alignment component in a spaced relationship to a golf hole on a contoured putting surface with the at least one frame in an operative state upon the contoured putting surface; and at least one support configured to maintain the at least one frame in the operative state. The alignment component is configured to be strategically spaced and located relative to a golf hole whereby a golf ball putted from a starting location spaced from the golf hole towards the alignment component will tend to track along the contoured putting surface towards the putting hole.

In one form, the at least one frame and alignment component are configured to be selectively moved relative to each other so that with the at least one frame in the operative state and maintained in one position, the alignment component can be moved relative to the at least one frame to thereby change a spacing between the alignment component and the golf hole.

In one form, the invention is directed to a method of practicing a putting stroke on a contoured putting surface with a golf hole. The method includes the steps of: obtaining the putting training system described above; placing the at least one frame in the operative state and relatively positioning the first and second alignment components to be in a first relationship based upon the contour of the putting surface so that a golf ball initially at a starting location spaced from the golf hole and directed towards the second alignment component will curve towards the golf hole by advancing the ball towards the second alignment component; and performing a putt with a golf ball initially at the starting location by advancing the ball towards the second alignment component.

In one form, the method further includes the step of changing a relationship between the first and second alignment components from the first relationship based upon an observed path of the golf ball advanced towards the second alignment component with the first and second alignment components in the first relationship.

DETAILED DESCRIPTION OF THE PREFERRED EMBODIMENT

Figure 1:
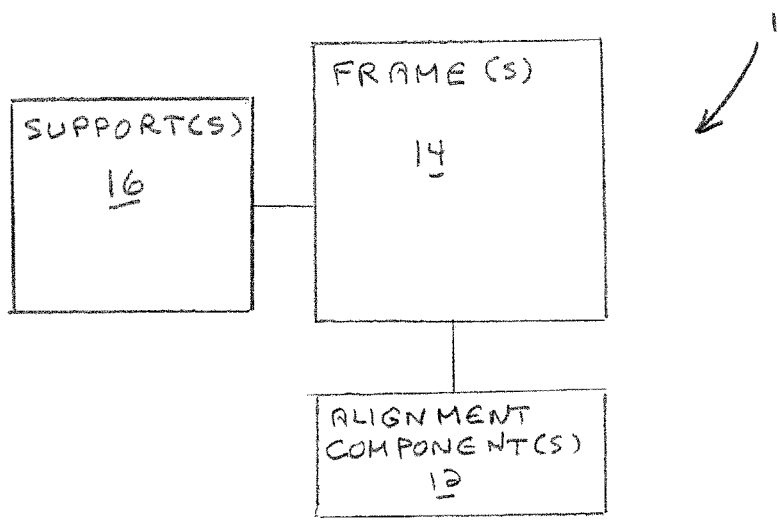
FIG. 1 is a schematic representation of a putting training system, according to the present invention, with at least one support and alignment component on a frame.

In FIG. 1, a basic form of the inventive putting training system is shown schematically at 10. The system 10 consists of at least one alignment component 12. Through at least one frame 14, the alignment component is maintained in spaced relationship to a golf hole on a contoured putting surface with the at least one frame 14 in an operative state upon that surface.

At least one support 16 is configured to maintain at least one frame 14 in the operative state. The support(s) 16 could be a part of the frame 14 or a structure separate therefrom.

Figure 2:
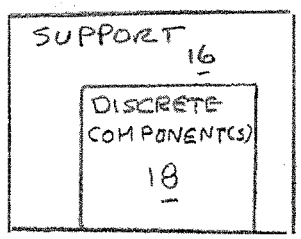
FIG. 2 is a schematic representation showing additional details of the support in FIG. 1.

As shown in FIG. 2, one form of the support 16 is made up of spaced, discrete components 18 arranged so that the at least one frame 14 bridges a space therebetween to allow stable placement of the system 10 upon a contoured putting surface in the vicinity of a golf hole.

Figure 3:
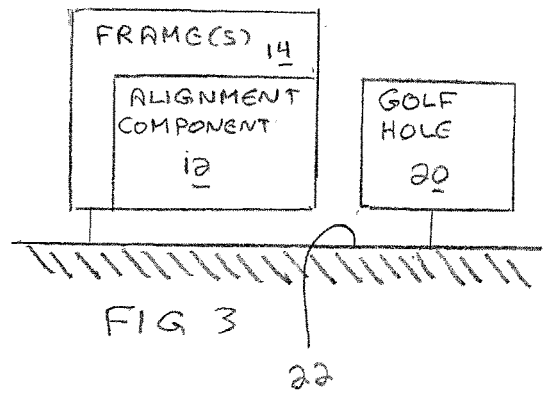
FIG. 3 is a schematic representation of a putting surface with a golf hole upon which the frame in FIG. 1 is operatively positioned.

As seen schematically in FIG. 3, the system 10 is configured so that one alignment component 12 can be strategically spaced and located relative to a golf hole 20 on a contoured putting surface 22 whereby a golf ball putted from a starting location spaced from the golf hole 20 and aimed towards the alignment component 12 will tend to track along the contoured putting surface 22 towards the putting hole 20.

The schematic showing in FIGS. 1-3 is intended to encompass virtually an unlimited number of different forms of the components and their cooperation. The embodiments described hereinbelow are exemplary in nature only and should not be viewed as limiting.

Figure 4:
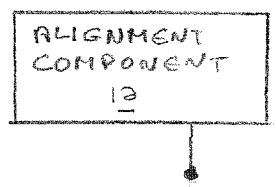
FIG. 4 is a schematic representation showing the FIG. 3 components in plan.
Figure 4:
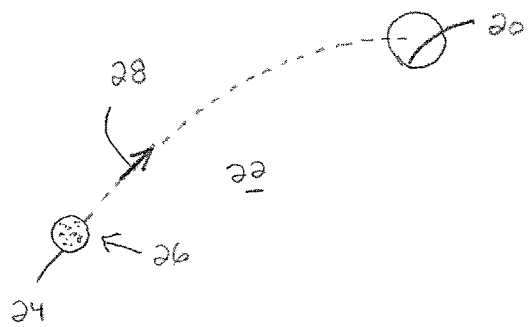

What is basic to all system designs is that, as shown in FIG. 4, there be at least one alignment component 12 that can be strategically situated relative to the golf hole 20 whereby a golf ball 24 putted from a starting location at 26 towards the alignment component 12, as indicated by the arrow 28, will move in a curved path portion towards the golf hole 20. The strategic placement of the alignment component 12 is carried out so that the golf ball 24 will consistently track towards the putting hole.

Figure 5:
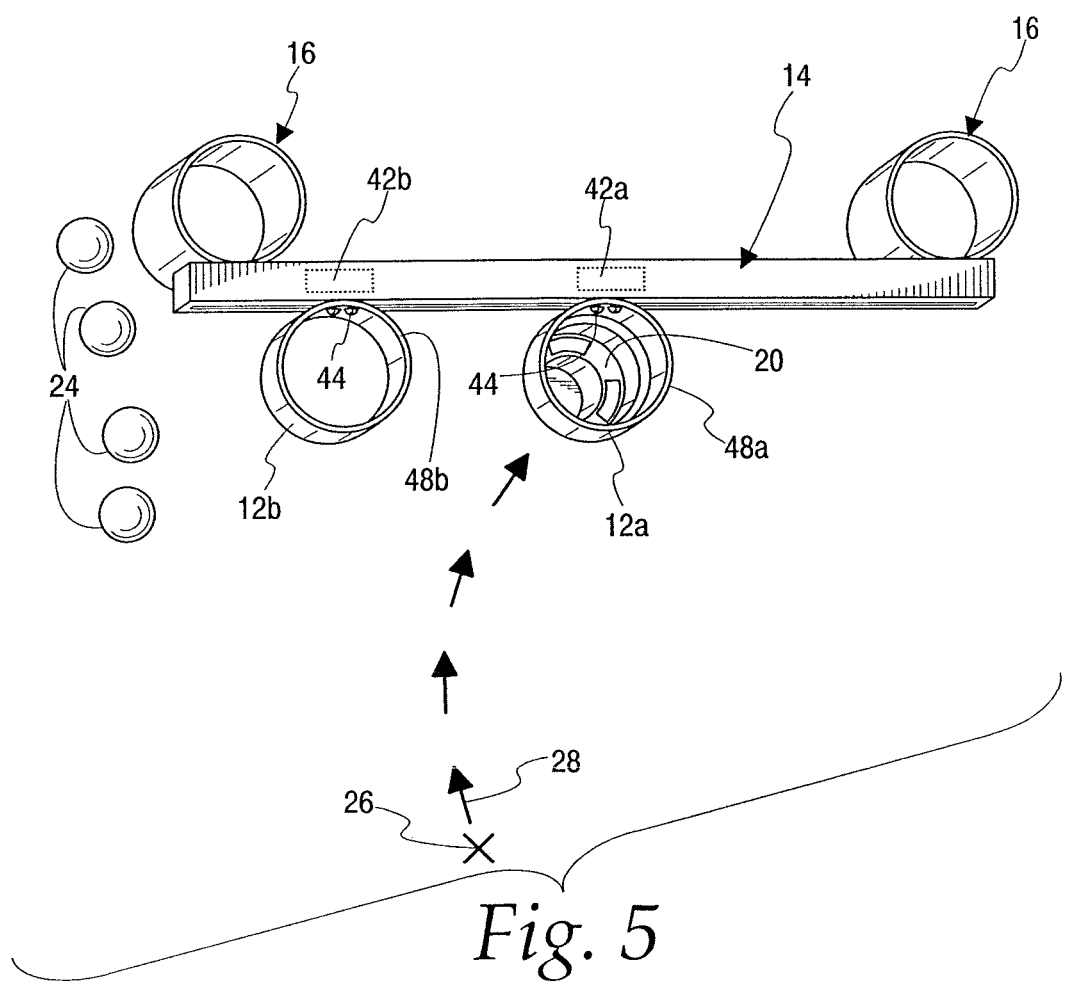
FIG. 5 is a view similar to that in FIG. 4 with a specific form of the system.
Figure 6:
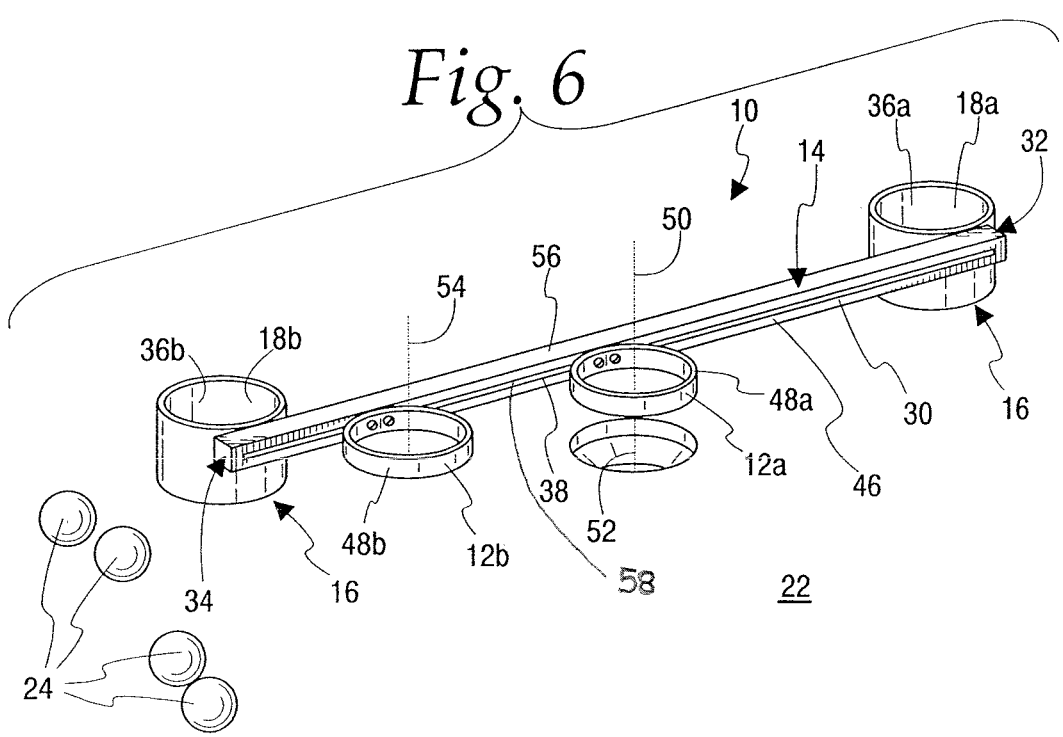
FIG. 6 is a view as in FIG. 5 from a different perspective.

As shown in FIGS. 5 and 6, in one specific form of the system 10, first and second alignment components 12a, 12b are provided on a frame 14 in the form of an elongate rail 30 with spaced lengthwise ends 32, 34.

In this embodiment, the support 16 consists of discrete components 18a, 18b mounted one each at the spaced rail ends 32, 34. The discrete components 18a, 18b have the same configuration. More particularly, they have bodies 36a, 36b, each with a like, annular shape. The shape of the body is not critical. It is desired that the bodies 36a, 36b bridge spaced locations on the putting surface 22 to stably support the system 10 even with a relatively significant slope or contour around the golf hole 20.

With the frame 14 maintained in the operative state of FIGS. 5 and 6 through the support 16, the alignment component 12a is located at or adjacent to the golf hole 20 and the alignment component 12b is strategically spaced from the alignment component 12a in a manner that golf balls 24, putted from the starting location 26 towards the alignment component 12b, will initially moves towards the alignment component 12b and eventually track towards the alignment component 12a and the hole 20 along the contoured putting surface 22.

In the depicted form, both alignment components 12a, 12b are mounted on the rail 30. The rail 30 is shown as an extruded part with a lengthwise guide slot 38. At least one, and in this embodiment both, of the alignment components 12a, 12b have an associated guide piece 42a, 42b, respectively. Through fasteners 44 a wall 46 on the rail 30 can be captively held between each of the alignment components 12a, 12b and its associated guide piece 42a, 42b. Through this arrangement, the alignment components 12a, 12b can each be moved guidingly lengthwise along the rail 30 to thereby change the relationship of each alignment component 12a, 12b relative to the rail 30 and the spacing between the alignment components 12a, 12b.

The rail 30, as depicted, defines a substantially straight path along which the alignment components 12a, 12b move relative to the rail 30 and each other.

While not a requirement, as depicted, each of the alignment components 12a, 12b has a body 48a, 48b with a like annular shape. This shape is selected since the alignment components 12a, 12b can be matched to the ground level, outside diameter of a golf hole 20 to thereby give the system user the visual sensation that he/she is aiming at a golf hole. As seen in FIGS. 4 and 5, the diameters of the bodies 48a,

48b are approximately the same as the diameter of the golf hole 20. This allows a user to relate golf ball curving on a slope to hole width. Also, this allows the function of the alignment components 12a, 12b to be reversed, as described below.

With this construction, the alignment component 48a can be situated so that its central axis 50 is coincident with the vertical axis 52 of the golf hole 20. This gives the user a clear identification of the location and size of the hole 20 that is the ultimate target.

The body 48b on the alignment component 12b has a central axis 54 that is substantially parallel to the axes 50, 52 with all axes 50, 52, 54 extending upwardly relative to the putting surface 22.

It should be emphasized that while the annular body shapes are desirable, virtually any size or shape of alignment component might be utilized so long as it gives a user the ability to visually sense, from the location of the golf ball 20, and a target location at which the ball will be initially directed, as identified by the alignment component 12b. As depicted, the alignment components 12a, 12b are spaced above the putting surface a distance less than the diameter of the golf hole (conventional 4W).

As depicted, the frame 14 and support 16 maintain the alignment components 12a, 12b in an elevated position such that a conventional golf ball 20 can roll thereunder and beneath the rail without interference. Thus, the ball path will not be obstructed by the alignment components 12a, 12b.

In the case of the alignment component 12a, it is not necessary that the golf ball 20 be able to move past the body 48a—only that it be able to move in its anticipated path without interference into the hole 20. That is, the golf ball 20 may move past a part of the body 48a in advancing into the hole 20. For example, the body 48a may be a curved segment or another shape that does not have to be elevated to avoid obstruction with the hole 20.

The rail slot 38 is bounded by a surface 58. The surface 58 and guide pieces 42a, 42b, as connected by the fasteners 44, function as cooperating connectors between the rail 30 and alignment components 12a, 12b that cooperate to guide sliding movement of the alignment components 12a, 12b. This configuration allows the connector arrangement to frictionally maintain the rail 30 and alignment components 12a, 12b in selected lengthwise relationships with a predetermined holding force. The holding force can be dictated by a degree of tightening of the fasteners 44 or by other means. With a moderate amount of frictional holding force, the alignment components 12a, 12b will maintain any position along the rail length in which they are slid. A relatively light force is adequate to use the system. When it is desired to reconfigure the system, the frictional forces can be overcome to move one or both of the alignment components 12a, 12b, thereby to selectively change the relationship with each other and between the alignment components 12a, 12b and the rail 30.

The invention also contemplates that one of the alignment components 12a, 12b may be rigidly fixed to the rail 30 with only the other alignment component 12a, 12b movable. For example, the alignment component 12b might be fixed, with the alignment component 12a movable. The system 10 is set up for a left-to-right break. If a right-to-left contour was being contended with, the function of the alignment components 12a, 12b might be reversed. That is, the alignment component 12b might be situated in coaxial relationship with the golf hole 20 with the alignment component 12a moved strategically to be at the target location for that putt.

Movement of both alignment components 12a, 12b gives an additional level of versatility with the same capabilities as described for the fixed construction.

Figure 7:
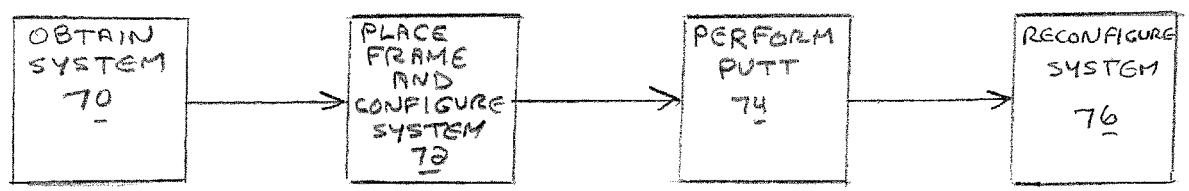
FIG. 7 is a flow diagram representation of a method of practicing a putting stroke according to the invention.

As shown in flow diagram form in FIG. 7, a method of practicing a putt can be carried out as follows. As shown at block 70, the putting training system, as described above, is obtained.

As shown at block 72, the at least one frame is placed in the operative state and the system configured by relatively positioning the first and second alignment components to be in a first relationship based upon a contour of the putting surface so that a golf ball initially at a starting location spaced from the golf hole and directed towards the second alignment component will curve towards the golf hole.

As shown at block 74, the putt is then performed.

Optionally, after one putt is performed, the system can be reconfigured by changing a relationship between the first and second alignment components from the first relationship based upon an observed path of the golf ball advanced towards the second alignment component with the first and second alignment components in the first relationship.

It should be understood that the method can be performed in essentially the same manner without requiring the alignment component at or adjacent to the golf hole.

The foregoing disclosure of specific embodiments is intended to be illustrative of the broad concepts comprehended by the invention.

The invention claimed is:

1. A method of practicing a putting stroke on a contoured putting surface with a golf hole having a vertical axis and a ground level diameter, the method comprising the steps of:
    obtaining a putting training system comprising:
    a first alignment component;
    a second alignment component configured to be situated at a location spaced from the first alignment component;
    at least one frame configured to maintain the first and second alignment components in a strategically selected spaced relationship within a range of permitted spaced relationships and placeable in an operative state wherein the second alignment component is strategically spaced from the first alignment component in a manner that a golf ball putted from a starting location spaced from the golf hole towards the second alignment component will tend to track along the contoured putting surface towards the golf hole; and
    at least one support for maintaining the at least one frame in the operative state,
    wherein each of the first and second alignment components has an annular shape with an axis and a diameter substantially the same as a ground level diameter of the golf hole;
    placing the at least one frame in the operative state with:
    a) the axes of the annular shapes of the first and second alignment components extending upwardly relative to the putting surface; b) the axis of the annular shape of the first alignment component concentric with the vertical axis of the golf hole; c) the first alignment component spaced above the contoured putting surface so that a conventional golf ball can move under the first alignment component; and d) no part of the putting training system required to reside in the golf hole to support the first alignment component, and relatively positioning the first and second alignment components to be in a first relationship based upon the contour of the putting surface so that a golf ball initially at a starting location spaced from the golf hole and directed towards the second alignment component will curve towards the golf hole by advancing the ball towards the second alignment component;

placing a golf ball on the putting surface at the starting location a distance away from the putting training system and the golf hole along the putting surface; and performing a putt with the golf ball initially at the starting location by advancing the golf ball towards the putting training system and the second alignment component thereon.

2. The method of practicing a putting stroke according to claim 1 further comprising the step of changing a relationship between the first and second alignment components from the first relationship based upon an observed path of the golf ball advanced towards the second alignment component with the first and second alignment components in the first relationship.

3. The method of practicing a putting stroke according to claim 1 wherein with the at least one frame in the operative state the second alignment component is spaced above the putting surface a distance less than the ground level diameter of the golf hole.

4. The method of practicing a putting stroke according to claim 1 wherein no part of the training system resides on or above the putting surface between the starting location and the second alignment component as the putt is performed.

5. A method of practicing a putting stroke on a contoured putting surface with a golf hole, the method comprising the steps of:

obtaining a putting training system comprising:

a first alignment component configured to be situated at or adjacent the golf hole on the contoured putting surface and comprising a first annular component with a first axis and a first diameter substantially the same as a ground level diameter of the golf hole;

a second alignment component configured to be situated at a location spaced from the first alignment component and comprising a second axis and a second annular component with a second diameter substantially the same as the ground level diameter of the golf hole;

at least one frame configured to maintain the first and second alignment components: a) in a strategically selected spaced relationship within a range of permitted spaced relationships; and b) spaced above the contoured putting surface so that a conventional golf ball can pass under the first and second alignment components; and at least one support for maintaining the at least one frame in an operative state;

placing the at least one frame in the operative state wherein the first and second axes extend upwardly relative to the putting surface and with the first alignment component at or adjacent the golf hole without any part of the putting training system required to be directed into the golf hole to support the first alignment component and relatively positioning the first and second alignment components to be in a first relationship based upon the contour of the putting surface so that a golf ball initially at a starting location spaced from the golf hole and directed towards the second alignment component will curve towards the golf hole by advancing the ball towards the second alignment component;

placing a golf ball on the putting surface at the starting location a distance away from the putting training system and the golf hole along the putting surface; and performing a putt with the golf ball initially at the starting location by advancing the ball towards the putting training system and the second alignment component thereon.

6. A method of practicing a putting stroke on a contoured putting surface with a golf hole having a ground level diameter, the method comprising the steps of:

obtaining a putting training system comprising:

a frame having spaced ends;

first and second spaced alignment components on the frame; and a support for maintaining the frame in an operative state;

placing the frame in operative state wherein the first alignment component is located spaced directly above the golf hole and no part of the putting training system is required to be directed into the golf hole;

placing a golf ball on the putting surface at a starting location a distance away from the putting training system and the golf hole along the putting surface;

with the frame in the operative state, performing a putt with the golf ball initially at the starting location by advancing the golf ball toward the putting training system and the second alignment component thereon that is situated so that the golf ball initially at the starting location directed towards the second alignment component will curve towards the golf hole, wherein the putting training system is configured so that with the frame in the operative state the golf ball moving from the starting location into the golf hole moves under the first alignment component.

7. The method of practicing a putting stroke according to claim 6 wherein with the at least one frame in the operative state the second alignment component is spaced above the putting surface a distance less than the ground level diameter of the golf hole.

8. The method of practicing a putting stroke according to claim 6 wherein no part of the training system resides on or above the putting surface between the starting location and the second alignment component as the putt is performed.

* * * * *